C. Jillson.
Propagating Box.
N° 94,169. Patented Aug. 24, 1869.

Witnesses
Thos. H. Dodge
Albert E. Fina

Inventor
Clark Jillson

United States Patent Office.

CLARK JILLSON, OF WORCESTER, MASSACHUSETTS.

Letters Patent No. 94,169, dated August 24, 1869.

IMPROVEMENT IN PROPAGATING-BOX FOR PLANTS.

The Schedule referred to in these Letters Patent and making part of the same.

*Know all men by these presents:*

That I, CLARK JILLSON, of the city and county of Worcester, and Commonwealth of Massachusetts, have invented certain new and useful Improvements in Propagating-Boxes; and I do hereby declare that the following is a full, clear, and exact description of the same, reference being had to the accompanying drawings, forming a part of this specification, in which—

Figure 1:
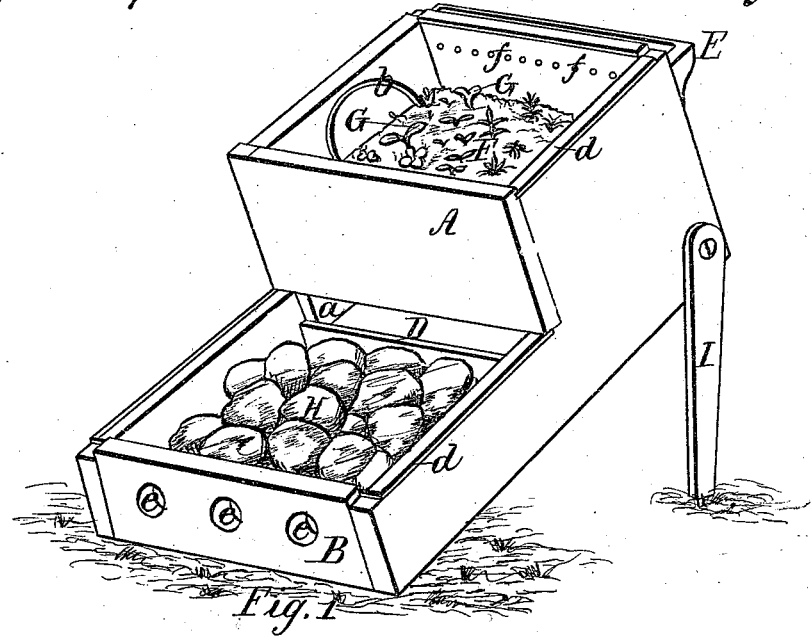
Figure 1 represents a perspective view of my improved propagating-box, as it appears when in use.
Figure 2:
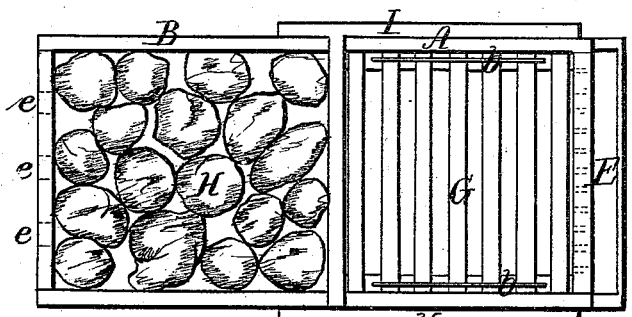
Figure 2 represents a top or plan view of the box before the straw and earth have been placed therein.
Figure 3:
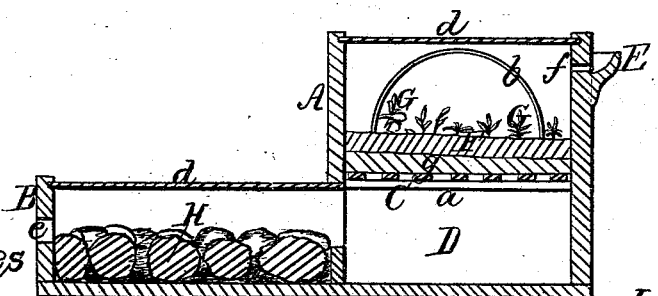
Figure 3 represents a longitudinal central section of the box and contents shown in fig. 1.

To enable those skilled in the art to which my invention belongs, to make and use the same, I will give a more detailed description thereof.

The nature of my invention consists—

First, in the combination, with the plant-box, of a solar-heat-retaining box, filled with stones, or the equivalents thereof, as hereafter explained.

Second, in such an arrangement of parts as to insure a constant permeation of the earth and roots of the plants by air heated by solar heat, as hereafter explained.

Third, in the combination, with the plant-box and solar-heat-retaining box, of the slatted or open earth-rack, as hereafter explained.

Fourth, in a plant-propagating box, the parts of which are constructed and arranged in relation to each other, as and for the purposes hereafter explained.

In the drawings—

A is the plant-propagating box;

B, the solar-heat-retaining box; and

C, the slatted earth and plant-supporting frame.

Frame C rests upon the pieces *a a*, fastened to the inner sides of the plant-box, and it is also provided with bails *b b*, by means of which it can be easily lifted out, for the purpose of transplanting the young and growing plants.

The space D, under the slatted frame C, serves as an air-chamber.

The tops of the boxes A and B are provided with sliding or other glass covers *d*, while the outer end of the box B is provided with air-holes *e*, and the front upper end of the box A is perforated with holes *f*, which serve for ventilation as well as for the ingress of water, which may be turned into the water-box E, for moistening the earth F in which the plants G grow.

The box B is to be filled with stones H, or some other solar-heat-retaining substance. I prefer to paint the stones black.

It may be well to place a straw covering over the slatted frame before putting in the earth.

The operation is as follows:

The boxes being filled and the legs I turned down, so as to elevate and support the boxes in the inclined position as shown in fig. 1, the heat from the sun is concentrated by the glass covers upon the earth and growing plants in the box A, and upon the stones H in the box B.

The heated air in the box B passes into the air-chamber D; thence up through the slatted frame C, straw *g*, and earth F, and out of the holes *f*, thereby keeping the roots constantly warm and the plants in a thrifty and growing condition.

During the daytime, the stones become highly heated, and consequently the heat therefrom is given out or gradually passes off during the night, and warms the air, which is in consequence kept in circulation through the earth and roots of the plants during the night, as well as the day.

Having described my improved propagating-box,

What I claim therein as new and of my invention, and desire to secure by Letters Patent, is—

1. The combination, with the plant-box, of a solar-heat-retaining box, partially filled with stones, or the equivalent thereof, substantially as and for the purposes set forth.

2. The arrangement of the perforated solar-heat-retaining box, perforated plant-box, and slatted earth-supporting frame, substantially as set forth, whereby a constant circulation of heated air is kept up, as and for the purposes described.

3. The combination, with the plant-box, constructed as described, of the double-bailed slatted earth-frame C, substantially as and for the purposes described.

4. A plant-propagating box, composed of the plant-box A, solar-heat-retaining box B, slatted earth-frame C, supporting-legs I, and water-box E, said parts being constructed and arranged in relation to each other, substantially as and for the purposes set forth.

CLARK JILLSON.

Witnesses:
THOS. H. DODGE,
ALBERT E. PEIRCE.